(12) United States Patent
Goldbach

(10) Patent No.: US 6,780,365 B2
(45) Date of Patent: Aug. 24, 2004

(54) PROCESS FOR PREPARING COMPOSITE MOLDED ARTICLES BY MULTICOMPONENT INJECTION MOLDING

(75) Inventor: Hubert Goldbach, Ratingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 184 days.

(21) Appl. No.: 10/072,366

(22) Filed: Feb. 7, 2002

(65) Prior Publication Data

US 2002/0109263 A1 Aug. 15, 2002

(30) Foreign Application Priority Data

Feb. 13, 2001 (DE) .......................................... 101 06 458

(51) Int. Cl.$^7$ .......................... B29C 45/13; B29C 45/14
(52) U.S. Cl. ....................... 264/251; 264/254; 264/261; 264/274; 264/275; 264/278; 264/328.8
(58) Field of Search ................................. 264/250, 251, 264/254, 255, 259, 261, 263, 274, 275, 278, 297.8, 328.2, 328.7, 328.8, 328.12; 425/129.1, 130, 572, 573

(56) References Cited

U.S. PATENT DOCUMENTS

| | | | |
|---|---|---|---|
| 2,241,180 A | | 5/1941 | Burke ............................. 18/61 |
| 5,413,743 A | * | 5/1995 | Prophet ........................ 264/1.7 |
| 5,658,041 A | | 8/1997 | Girardot et al. ............. 296/194 |
| 5,670,184 A | * | 9/1997 | Nakamichi et al. .......... 425/130 |
| 5,695,699 A | * | 12/1997 | Naritomi .................... 264/46.4 |
| 6,120,714 A | * | 9/2000 | Allan et al. ..................... 264/69 |
| 6,296,797 B1 | * | 10/2001 | Ziegler et al. ............... 264/255 |

FOREIGN PATENT DOCUMENTS

| | | |
|---|---|---|
| DE | 34 03 036 | 7/1986 |
| EP | 0 995 668 | 4/2000 |
| WO | 01/00478 | 1/2001 |

* cited by examiner

*Primary Examiner*—Angela Ortiz
(74) *Attorney, Agent, or Firm*—Joseph C. Gil; James R. Franks

(57) ABSTRACT

A process for producing a composite molded article is described. The composite molded article includes: (i) at least one base body (1) having a contoured surface; (ii) at least one first thermoplastic part (4, 5, 6); and (iii) at least one second thermoplastic part (2, 3), each of the first and second thermoplastic parts being joined to the base body. The process includes, (a) providing a multicomponent injection molding tool (20) having at least two separate melt flow-way systems and at least two cavities in which each of the first and second thermoplastic parts are separately formed, each of the cavities are in separate communication with each of the separate melt flow-way systems. The base body is placed into the molding tool in a second step (b). The cavities of the mold are separated from each other by a combination of the contoured surface of the base body and sealing edges of the molding tool that abut the contoured surface of the base body. In a third step (c), a thermoplastic material is injected simultaneously into each of the cavities by means of the separate melt flow-way systems. The first and second thermoplastic parts (ii) and (iii) each become joined to the base body (i) during injection molding step (c). In a final step (d), the composite molded article is removed from the molding tool.

10 Claims, 5 Drawing Sheets

PROCESS FOR PREPARING COMPOSITE MOLDED ARTICLES BY MULTICOMPONENT INJECTION MOLDING

CROSS REFERENCE TO RELATED PATENT APPLICATION

The present patent application claims the right of priority under 35 U.S.C. §119 (a)–(d) of German Patent Application No. 101 06 458.6, filed Feb. 13, 2001.

FIELD OF THE INVENTION

The present invention relates to a process for the production of composite molded articles comprising at least one base body, at least one first thermoplastic part and at least one second thermoplastic part that are concurrently formed and joined to the base body by injection molding. The first and second plastic parts may be composed of different plastic materials. The base body is first placed in a multicomponent injection molding tool having at least two separate melt flow-way systems (melt injection passages or ports) and at least two cavities for each of the first second plastic parts. The plastic materials from which the first and second plastic parts are formed, are then concurrently injected into the cavities, followed by removing the composite part from the mold. BACKGROUND OF THE INVENTION The fabrication of injection molded parts by means of multicomponent production technology is generally known. Such known processes typically involve injecting the individual plastic components, in succession, into a plurality of separate molds in a base body.

A generic process has furthermore become known from specification DE 3 503 036 A1, in which a first hollow space is filled with a first thermoplastics material by means of movable cores in a first step, and then in a second step a further hollow space is formed by withdrawing a moveable tool element. A second plastics component is then injected into the remaining hollow space and partially joined to the first plastic component.

A disadvantage of such known generic processes is that they typically have a long cycle time. One has to wait for the first plastics component to cool down since otherwise the structure of the first plastics part would be damaged. In addition, such processes typically require the use of complicated tools having special slide bars.

SUMMARY OF THE INVENTION

The object of the present invention is accordingly to provide a process that avoids the aforedescribed disadvantages of the known processes, and at the same time allows for the formation of a specific interlocking connection between the various plastics parts composed of different plastic materials.

This object is achieved according to the invention where, in a process of the type mentioned in the introduction, a base body is placed in an injection molding tool, the base body separating the cavities for the plastic parts from one another by corresponding and abutting sealing edges in the tool. A simultaneous injection of the various plastics materials into the cavities is thereby made possible. The base body also serves to join the various plastic parts formed by means of the simultaneous injection.

In accordance with the present invention, there is provided a process for producing a composite molded article comprising, (i) at least one base body (1) having a contoured surface,
(ii) at least one first thermoplastic part (4, 5, 6), and
(iii) at least one second thermoplastic part (2, 3), each of said first and second thermoplastic parts being joined to said base body, said process comprising:
  (a) providing a multicomponent injection molding tool (20) having at least two separate melt flow-way systems and at least two cavities in which each of the first and second thermoplastic parts are separately formed, each of said cavities being in separate communication with each of said separate melt flow-way systems;
  (b) placing said base body into said molding tool, said cavities being separated from each other by the contoured surface of said base body and sealing edges of said molding tool that abut the contoured surface of said base body;
  (c) injecting simultaneously a thermoplastic material into each of said cavities by means of said separate melt flow-way systems; and
  (d) removing said composite molded article from said molding tool, wherein said first thermoplastic part (ii) and second thermoplastic part (iii) each become joined to said base body (i) during said injection molding step (c).

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the examples, or where otherwise indicated, all numbers or expressions, such a those expressing structural dimensions, etc, used in the specification and claims are to be under stood as modified in all instances by the term "about."

BRIEF DESCRIPTION OF THE DRAWING FIGURES

Figure 5:
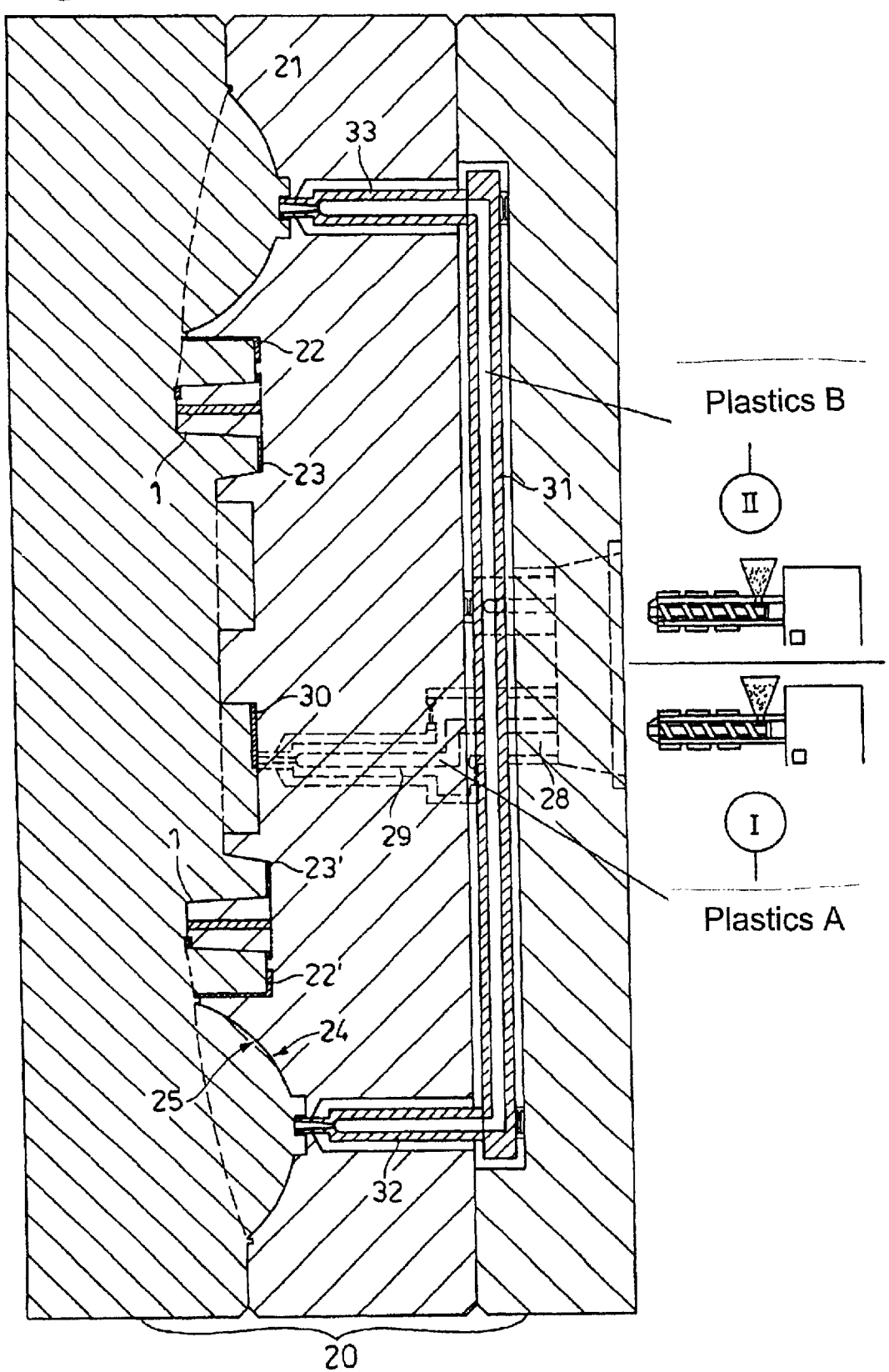
Figure 6:
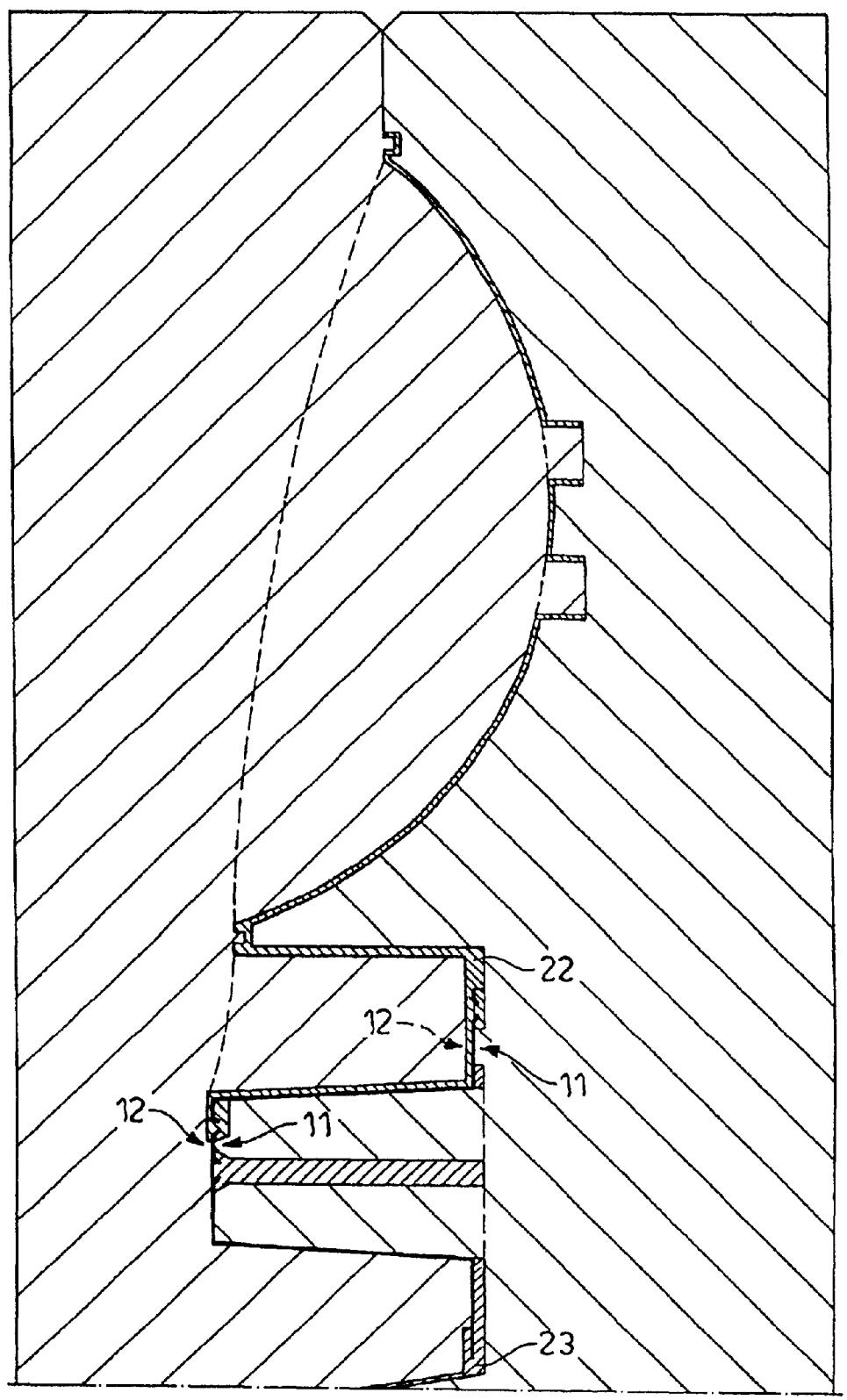

FIG. 5 is a sectional representation of a molding tool used in the process of the present invention; and FIG. 6 is a sectional representation of the molding tool of FIG. 5 showing further detail in the region of nozzle 33 with regard to sealing surfaces 11 and 12.

In FIGS. 1–6, like reference numerals represent the same structural parts and passages. FIGS. 1–6 are not drawn to scale.

DETAILED DESCRIPTION OF THE INVENTION

The base body (i) of the composite molded article may be fabricated from a metal or a thermoplastic material. Metals from which the base body may be fabricated include, but are not limited to, steel, aluminum, magnesium and alloys of these metals with other metals. Thermoplastic materials from which the base body (i) may be fabricated include, for example, polyamide, polyester, polyolefin, styrene copolymer, polycarbonate, polypropylene, polyphenylene sulfide, polyimide, PSO, PEEK and combinations or mixtures thereof.

In a preferred embodiment of the present invention, the base body is fabricated from a metal, e.g., steel or aluminum. When the base body is fabricated from a metal, the composite molded article is a composite plastic-metal molded article.

Thermoplastics materials from which the first and second plastic parts may each be independently selected include, but are not limited to: polyamide, polyester, polyolefin, in particular styrene copolymers, polycarbonate, polypropylene, polyphenylene sulfide, polyimide, polyvinyl chloride, polyurethane, PSO, PEEK, and mixtures or combinations thereof. In an embodiment of the present invention, the thermoplastic material of the first thermoplastic part (ii) is different than the thermoplastic material of the second thermoplastic part (iii).

The thermoplastic material of each of the first and second thermoplastic parts (ii) and (iii), and the base body (i) may each be independently reinforced with at least one reinforcing material. The reinforcing material is typically present in a reinforcing amount, i.e., an amount that is sufficient to result in a reinforced composite molded article. Reinforcing materials include those known to the skilled artisan, e.g., glass fibers, metal fibers, carbon fibers, glass beads and combinations thereof. In a preferred embodiment of the present invention, the thermoplastic material of the first and/or second thermoplastic parts comprises a reinforcing amount of glass fibers.

The invention preferably provides for the formation of an interlocking connection of one or more plastic parts with the base body, in particular with an edge of the base body, that permits a displacement of the plastic parts on the base body in at least one direction, preferably in the longitudinal direction of the plastic part. In this way the plastic part can contract without any hindrance on the base body after removal of the plastic composite structural article from the mold. Deformation and internal stresses can be substantially avoided in the composite structural article.

In a preferred embodiment of the present invention, the composite molded article comprises a plurality of base bodies (i). The process of preparing such a composite molded article involves, in step (b), placing a plurality of separate base bodies (i) in the molding tool. The plurality of separate base bodies (i) become joined one to the other and to the first and second thermoplastic parts by means of the thermoplastic material injected into the cavities of the molding tool in step (c).

The composite articles produced by the process of the present invention may serve as structural parts for use in the vehicle construction sector, e.g. as seat structures, door units, front end parts, door sills with a combination of elastic and rigid plastics materials, entry strips, radiators, or as housings for domestic appliances, small electrical devices and office equipment.

The invention is illustrated in more detail hereinafter by the examples and with the aid of the drawing figures, which however are not intended to be restrictive of the invention.

EXAMPLES

Example 1

Figure 1:
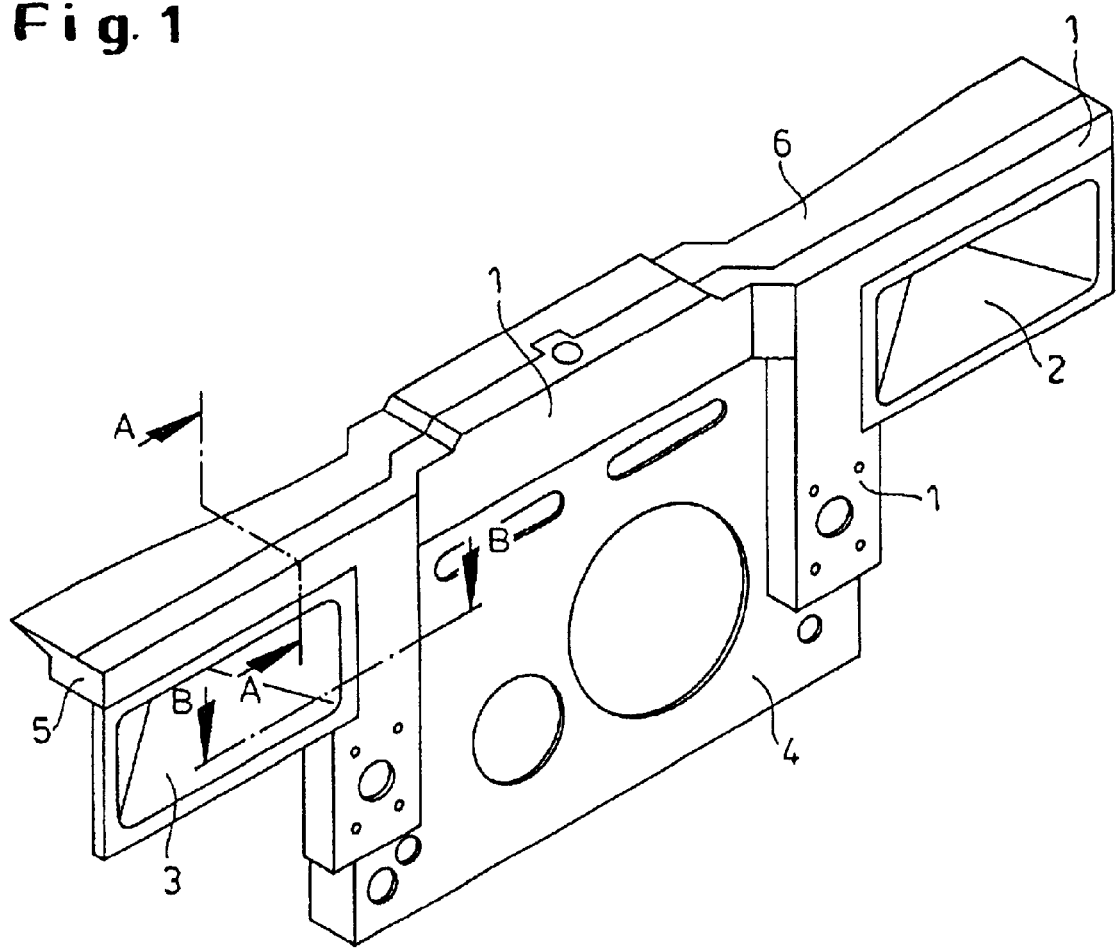
FIG. 1 is a representative perspective view of a support structure for the front unit of a vehicle, produced by the process of the present invention.

FIG. 1 shows the support structure for the front unit of a vehicle consisting of the base body 1 of sheet steel, two headlamp supports 2,3 of an unreinforced amorphous thermoplastics material (polycarbonate—ABS mixture), a radiator unit support 4 of a glass fibre-reinforced thermoplastics material (polyamide), a rib structure 5 of a glass fibre-reinforced thermoplastics material (polyamide) and a screen 6 of a glass fibre-reinforced thermoplastics material (polyamide).

Figure 2:
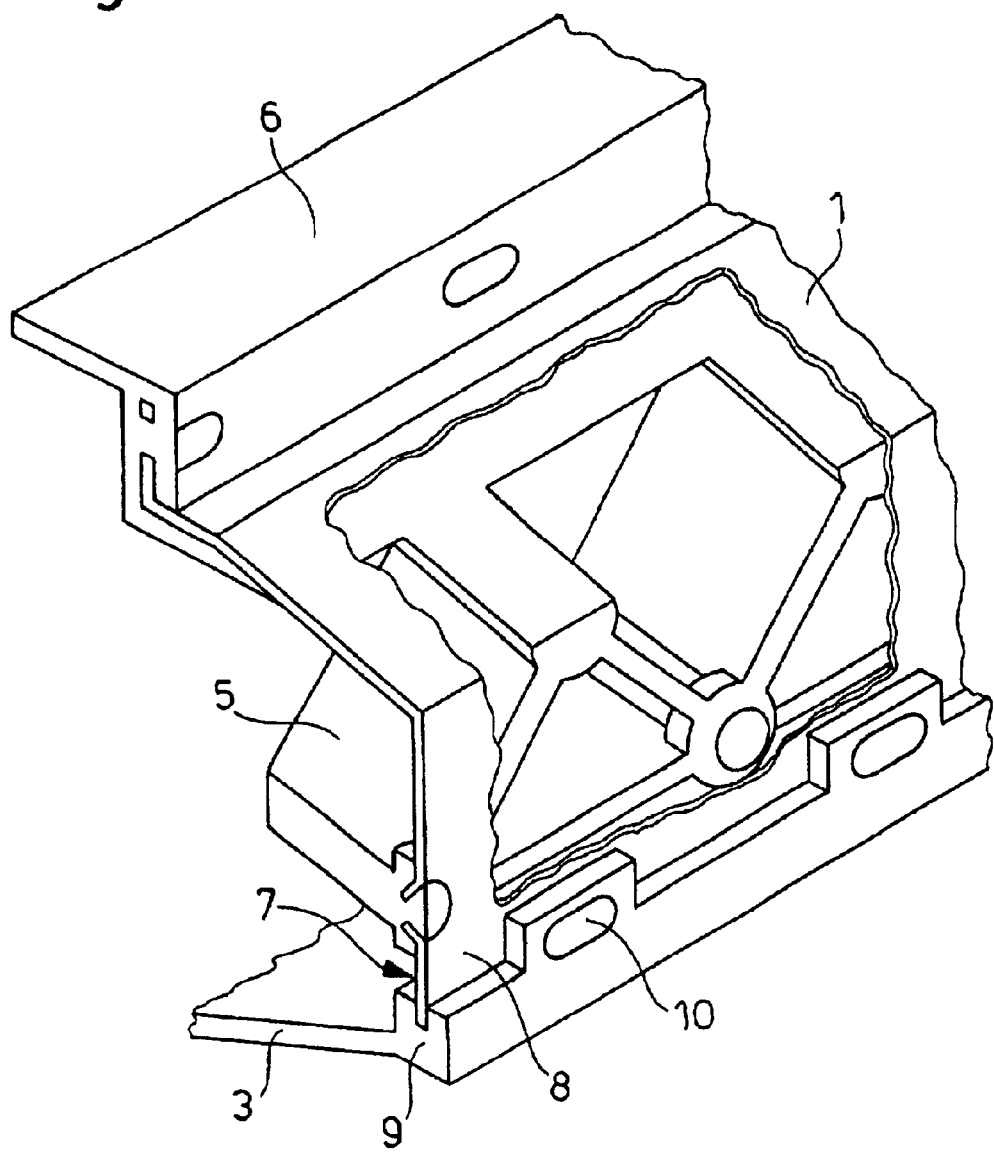
FIG. 2 is a representative perspective view of section A—A of FIG. 1.

FIG. 2 shows a section through the base body 1, the screen 6, the rib structure 5 and the headlamp support 3. The rib structure 5 and the screen 6 form a unit and are joined to the base body 1. The headlamp support 3 is separated from the rib structure 5 via the sealing surfaces 7,8 on the base body 1, but is rigidly joined in an interlocking manner to the base body 1 via the edge 9 encapsulated by injection molding and the sprueless injection molded part 10. The base part 1 is shown cut away in the middle, for purposes of revealing the shape of the rib structure there beneath.

Figure 3:
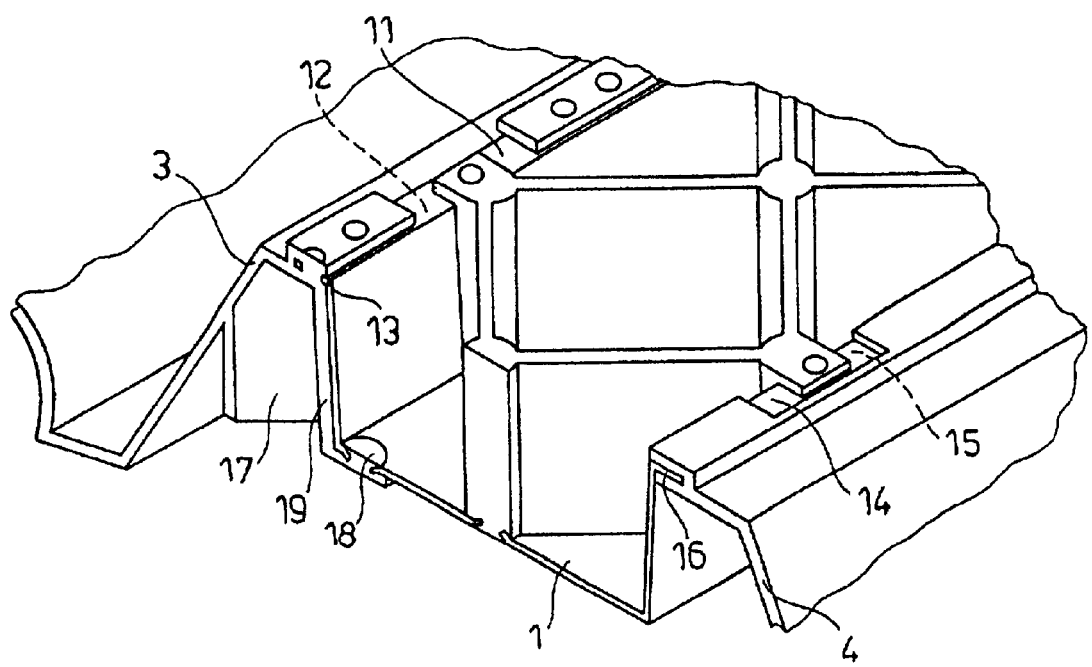
FIG. 3 is a representative perspective view of section B—B of FIG. 1.

FIG. 3 shows a section through the vertical strut of the base body 1 and horizontally through the headlamp support 3 and the radiator unit support 4.

The rib structure 5 is rigidly joined to the base body 1. The rib structure is separated from the headlamp support 3 and the radiator unit support 4 by the sealing surfaces 11,14 above the base body 1 and the sealing surfaces 12,15 underneath the base body 1.

The headlamp support 3 is rigidly connected in an interlocking manner to the base body via the ribs 17, the web 19, the sprueless injection molding point 18 and the edge 13 encapsulated by injection molding with sprueless injection molding points.

The radiator unit support 4 is joined in an interlocking manner to the base body 1 via the edge encapsulated by injection molding 16.

Example 2

Figure 4:
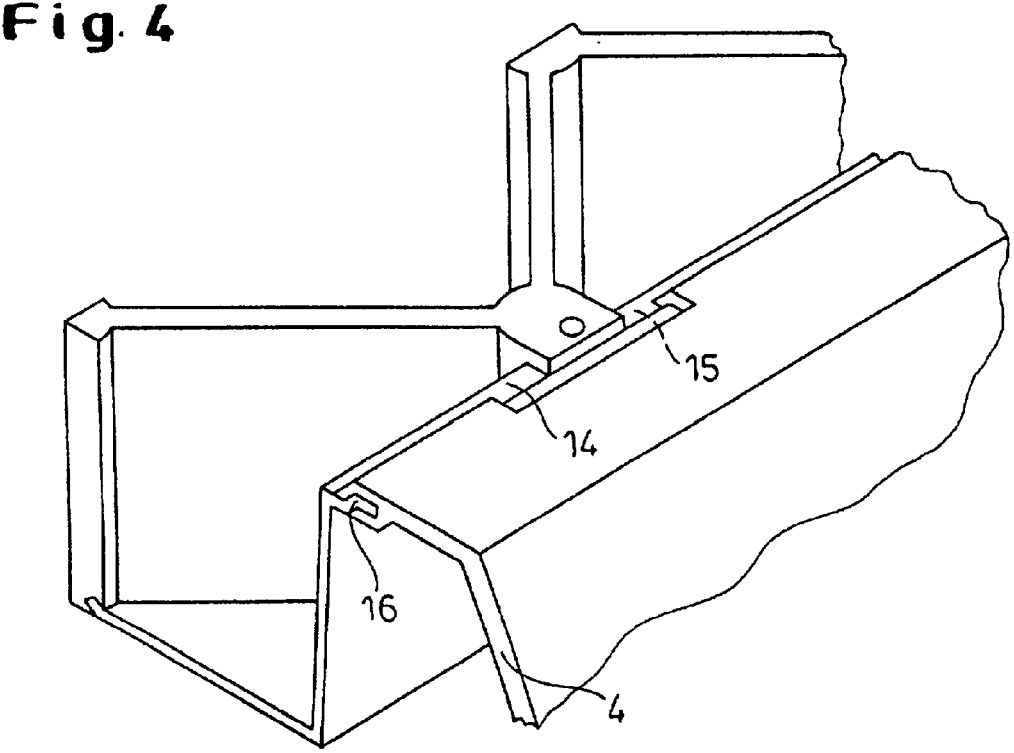
FIG. 4 is a representative perspective view of a support structure similar to that of FIG. 3, in which the edge encapsulated by injected molded plastic 16 is in the shape of a Z.

FIG. 4 shows a variant of the structural part according to FIG. 1 in the same section as in FIG. 3, though the edge encapsulated by injection molding 16 has a Z-shape, with the result that the radiator unit support is rigidly joined to the base body 1, though movement of the said radiator unit support in the longitudinal direction of the edge 16 is permitted.

Example 3

A shell-shaped base body 1, preferably of deep-drawn steel sheet, aluminium sheet or also plastics material, is automatically placed in a contour-tight manner via a robot in an open injection molding tool 20, preferably on the injection side 21.

By the closure of the injection molding tool (FIG. 5) the base body 1 is accommodated in a largely interlocking manner due to the contour surface 24 of the injection side and due to contour surfaces 25 of the closure side, as far as the hollow spaces 22, 23 for the plastics materials A and B. In this way sealing surfaces 7, 8 (cf. FIG. 1); 11, 12 (FIGS. 3 and 6); 14, 15 (FIGS. 3 and 4) etc., can be formed, with the result that the individual plastics materials A and B can flow during the injection process absolutely separately into the provided hollow spaces 22,23.

After the closure of the injection molding tool the adjoining injection molding units I and II simultaneously inject the respective amounts of plastics materials for the plastics components A and B.

The plastics melt A flows under the injection pressure of the injection molding unit 1 into the hot channel divider 28, to the hot channel nozzle 29 in the cold divider 30, and then to the mold cavity (hollow space) 23. The hot channel nozzle could also be connected directly to the mold cavity 23.

The plastics melt B flows simultaneously through the hot channel divider 31 to the nozzles 32, 33 and from there directly into the hollow spaces 22 or through cold dividers into these hollow spaces.

After the injection process the plastics melt is normally subjected to a follow-up pressure up the gate sealing point of the sections. The plastics material is cooled further via the temperature control system of the injection molding tool.

After ca. 25–50 seconds, depending on the wall thickness and size of the molded pat, the tool can be opened and the multicomponent injection molded part can be removed.

A handling device takes the shell-shaped base body and places it on the injection side of the cavity. The handling device rotates the gripper to the closure side and removes the finished multicomponent injection molded part and normally places it on a conveyor belt, whereby during the removal and placing of the part sprues for example can be removed.

Multicomponent injection molded parts can be produced by this procedure in a normal injection molding cycle of 35–120 seconds, depending on the size and weight of the article.

The base body 1 is furthermore envisaged for use in lightweight structures. In other cases a frame part would have to be co-injected as base body 1 separately or in the multicomponent injection molding tool in one workstake. This would entail an additional operation for the handling device (removal of the finished part and frame part, rotation and placing of the frame part, followed in turn by the removal and setting down of the finished part).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a composite molded article comprising,
   (i) at least one base body having a contoured surface,
   (Ii) at least one first thermoplastic part, and
   (iii) at least one second thermoplastic part, each of said first and second thermoplastic parts being joined to said base body,
said process comprising:
   (a) providing a multicomponent injection molding tool having at least two separate melt flow-way systems and at least two cavities in which each of the first and second thermoplastic parts are separately formed, each of said cavities being in separate communication with each of said separate melt flow-way systems;
   (b) placing said base body into said molding tool, said cavities being separated from each other by the contoured surface of said base body and sealing edges of said molding tool that abut the contoured surface of said base body;
   (c) injecting simultaneously a thermoplastic material into each of said cavities by means of said separate melt flow-way systems; and
   (d) removing said composite molded article from said molding tool,
wherein said first thermoplastic part (ii) and second thermoplastic part (iii) each become joined to said base body (i) during said injection molding step (c).

2. The process of claim 1 wherein the thermoplastic material of each of said first and second thermoplastic parts (ii) and (iii) is independently selected from at least one of polyamide, polyester, polyolefin, styrene copolymer, polycarbonate, polypropylene, polyphenylene sulfide, polyimide, PSO and PEEK.

3. The process of claim 1 wherein the thermoplastic material of said first thermoplastic part (ii) is different than the thermoplastic material of said second thermoplastic part (iii).

4. The process of claim 1 wherein said base body (i) has edges, at least a portion of the edges of said base body (i) become embedded in the thermoplastic material of at least one of said first thermoplastic part (ii) and said second thermoplastic part (iii) during injection molding step (c), thereby forming an interlocking connection between said base body (i) and at least one of said first and second thermoplastic parts.

5. The process of claim 1 wherein the thermoplastic material of each of said first and second thermoplastic parts (ii) and (iii) are each independently reinforced with a reinforcing amount of at least one reinforcing material.

6. The process of claim 5 wherein said reinforcing material is selected from glass fibers, metal fibers, carbon fibers, glass beads and combinations thereof.

7. A process for producing a composite molded article comprising,
   (i) at least one base body having a contoured surface, said base body being fabricated from a material selected from one of metal and thermoplastic material,
   (ii) at least one first thermoplastic part, and
   (iii) at least one second thermoplastic part, each of said first and second thermoplastic parts being joined to said base body,
said process comprising:
   (a) providing a multicomponent injection molding tool having at least two separate melt flow-way systems and at least two cavities in which each of the first and second thermoplastic parts are separately formed, each of said cavities being in separate communication with each of said separate melt flow-way systems;
   (b) placing said base body into said molding tool, said cavities being separated from each other by the contoured surface of said base body and seating edges of said molding tool that abut the contoured surface of said base body;
   (c) injecting simultaneously a thermoplastic material into each of said cavities by means of said separate melt flow-way systems; and
   (d) removing said composite molded article from said molding tool,
wherein said first thermoplastic part (ii) and second thermoplastic part (iii) each become joined to said base body (i) during said injection molding step (c).

8. The process of claim 7 wherein the metal from which said base body (i) is fabricated is selected from the group consisting of steel, aluminum, magnesium and alloys of these metals with other metals; the thermoplastic material from which said base body (i) is fabricated is selected from at least one of polyamide, polyester, polyolefin, styrene copolymer, polycarbonate polypropylene, polyphenylene sulfide, polyimide, PSO and PEEK.

9. The process of claim 7 wherein said base body is fabricated from metal, and said composite molded article is a plastic-metal composite molded article.

10. A process for producing a composite molded article comprising, (i) a plurality of separate base bodies each having a contoured surface, (ii) at least one first thermoplastic part, and (iii) at least one second thermoplastic part, said first and second thermoplastic parts joining said plurality of separate base bodies one to the other, said process comprising:

(a) providing a multicomponent injection molding tool having at least two separate melt flow-way systems and at least two cavities in which each of the first and second thermoplastic parts are separately formed, each of said cavities being in separate communication with each of said separate melt flow-way systems;

(b) placing said plurality of separate base bodies into said molding tool, said cavities being separated from each other by the contoured surface of each base body and sealing edges of said molding tool that abut the contoured surface of each base body;

(c) injecting simultaneously a thermoplastic material into each of said cavities by means of said separate melt flow-way systems; and (d) removing said composite molded article from said molding tool, wherein said first thermoplastic part (ii) and second thermoplastic part (iii) each become joined to said plurality of base bodies (i) during said injection molding step (c), and further wherein said plurality of separate base bodies (i) are joined one to the other by means of said thermoplastic material injected into the cavities of said molding tool in step (c).

* * * * *